(12) United States Patent
Dziesietnik et al.

(10) Patent No.: US 6,429,949 B1
(45) Date of Patent: Aug. 6, 2002

(54) LOW MEMORY PRINTER CONTROLLER

(75) Inventors: Ghilad Dziesietnik, Palo Alto; Pierre Lermant, Sunnyvale, both of CA (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

(21) Appl. No.: 09/174,056

(22) Filed: Oct. 15, 1998

(51) Int. Cl.$^7$ .......................... G06K 1/00; G06F 15/00; H04N 1/40; H04N 1/46
(52) U.S. Cl. ...................... 358/1.16; 358/1.9; 358/1.18; 358/456; 358/504
(58) Field of Search ............... 358/1.16, 1.18, 358/455, 461, 453, 456, 403, 1.9, 504, 521, 518

(56) References Cited

U.S. PATENT DOCUMENTS

| | | | |
|---|---|---|---|
| 4,941,038 A | 7/1990 | Walowit | 358/80 |
| 4,998,144 A | 3/1991 | Karn | 355/326 |
| 5,023,813 A | 6/1991 | Brown, III | 364/518 |
| 5,146,548 A | * 9/1992 | Bijnagte | 358/1.18 |
| 5,150,454 A | 9/1992 | Wood et al. | 395/114 |
| 5,459,492 A | 10/1995 | Venkateswar | 347/253 |
| 5,506,994 A | 4/1996 | Sugita | 395/800 |
| 5,521,990 A | 5/1996 | Ishizawa | 382/270 |
| 5,528,740 A | 6/1996 | Hill et al. | 395/128 |
| 5,548,407 A | 8/1996 | von Kienlin | 358/298 |
| 5,552,898 A | 9/1996 | Deschuytere | 358/426 |
| 5,572,632 A | 11/1996 | Laumeyer et al. | 395/116 |
| 5,614,937 A | 3/1997 | Nelson | 347/240 |
| 5,627,580 A | 5/1997 | Nelson | 347/239 |
| 5,704,022 A | 12/1997 | Ethington et al. | 395/115 |
| 5,737,503 A | 4/1998 | Mitani | 395/115 |

FOREIGN PATENT DOCUMENTS

| | | | | |
|---|---|---|---|---|
| EP | 0378448 A2 | 7/1990 | | H04N/1/46 |
| EP | 597 571 A3 | 5/1994 | | G06F/15/72 |
| EP | 597 571 A2 | 5/1994 | | G06F/15/72 |
| EP | 0661886 A2 | 7/1995 | | H04N/1/036 |
| EP | 0703524 B1 | * 3/1996 | | G06F/3/00 |
| EP | 0709012 B1 | 5/1996 | | H04N/1/41 |
| EP | 0767581 A1 | 4/1997 | | H04N/1/56 |
| EP | 0806864 A2 | 11/1997 | | H04N/1/40 |
| EP | 0810770 A2 | 12/1997 | | H04N/1/40 |
| EP | 0810771 A2 | 12/1997 | | H04N/1/40 |
| EP | 585 524 B1 | 11/1998 | | G06K/15/00 |
| WO | WO 95/28685 | 10/1995 | | G06K/15/002 |
| WO | WO 96/41308 | 12/1996 | | G06K/15/00 |
| WO | WO 97/02542 | 1/1997 | | G06K/15/00 |

* cited by examiner

*Primary Examiner*—Mark Wallerson
*Assistant Examiner*—Twyler Lamb

(57) ABSTRACT

Apparatus and methods are provided that enables color printers to render color or black and white files in a reduced memory configuration, and in a time efficient fashion.

38 Claims, 4 Drawing Sheets

LOW MEMORY PRINTER CONTROLLER

BACKGROUND OF THE INVENTION

TECHNICAL FIELD

The invention relates to printing. More particularly, the invention relates to a printer controller that allows color printers to interpret, render, and print graphic files efficiently.

DESCRIPTION OF THE PRIOR ART

High resolution (600 dpi and up) contone (each color channel is 8-bit encoded) printers typically must be shipped with a large size random access memory, or RAM, to meet performance criteria. This memory requirement drives up the overall cost of such printers. Presently, software or hardware based mechanisms somewhat address this issue by providing compression methods and/or line or band rendering techniques. See, for example, B. Ethington, J. Gostomski, J. Minnick, C. Songer, Printer With High Bandwidth Compression Architecture, U.S. pat. No. 5,704,022 (Dec. 30, 1997); P. Wood, S. Kochan, Printing System and Method, U.S. pat. No. 5,150,454 (Sep. 22 1992); F. Deschuytere, Lossy and Lossless Compression In Raster Image Processor, U.S. pat. No. 5,552,898 (Sep. 3, 1996); M. Herregods, R. Baeten, G. Noppen, High Quality Multilevel Halftoning For Colour Images With Reduced Memory Requirements, European Patent Specification No. 709,012 (Nov. 19, 1997); and M. Herregods, D. Tjantele, Variable data filed in a pages description language, European Patent Specification No. 703,524 (Jan. 8, 1997).

These various approaches allow the processing of complex color files in reduced memory configurations, but they often dramatically decrease speed performance due to the need to compress and decompress and/or band render such color files.

It is therefore highly desirable to provide a mechanism that allows color printers to render color or black and white files in a reduced memory configuration, and in a time efficient fashion.

SUMMARY OF THE INVENTION

The invention provides a mechanism that allows color printers to render color or black and white files in a reduced memory configuration, and in a time efficient fashion. In a preferred embodiment of the invention, an incoming data file representing a page to be printed is provided to an interpreter. In the data file there is an object that is to be rendered by the interpreter. The interpreter requests an uncompressed representation of a patch (i.e. A portion of the page to be printed), where the patch intersects with the object that is to be rendered. A patch cache holds a collection of patches of different locations and different types. If the requested patch is not in the patch cache, room is made in the patch cache by compressing the least recently used patch data. The requested patch is then decompressed into the patch cache from a compressor. The compressor holds a collection of compressed patch data that tiles the entire page. Each patch is compressed independently from one another. Thus, the logical page representation is broken down into patches, where the breakdown is known to the interpreter and the compressor. A stitcher uses a stitching process to turn the patch page representation into a compressed line, band, or full page representation. The representation is stored in a frame buffer. Dedicated hardware and/or software decompresses the frame buffer on-the-fly and places colored dots on the printed page.

DETAILED DESCRIPTION OF THE INVENTION

Figure 1:
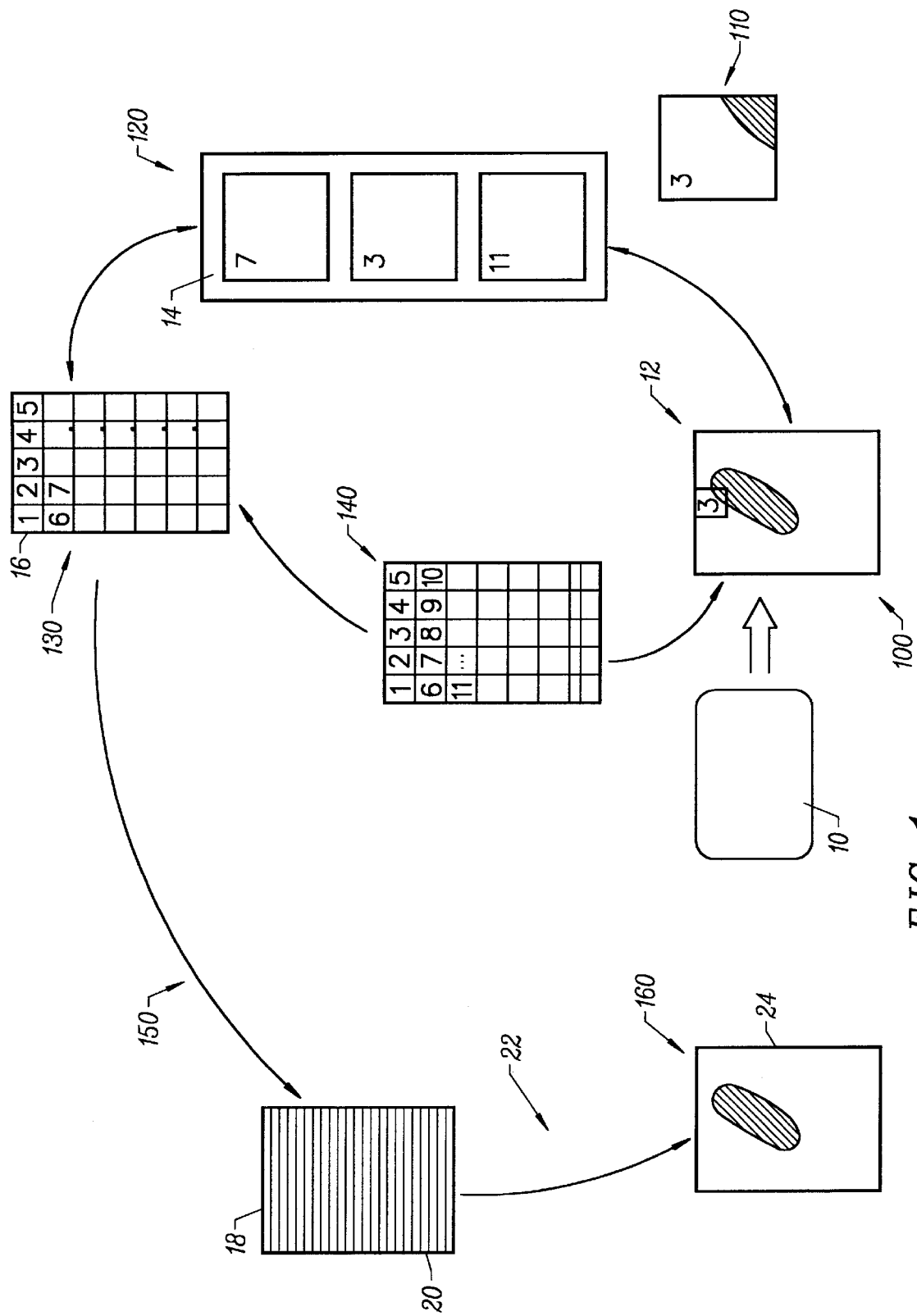
FIG. 1 is a block schematic diagram showing a page processing overview according to the invention.

The preferred embodiment of the invention provides a mixed hardware-software device, referred to as a low memory printer controller, that enables low memory contone print systems to interpret, render, and print color or black and white graphic files in a time efficient fashion.

The preferred embodiment of the invention comprises the following components:

1) Patches.

A patch is a software structure (per analogy to a C structure) that holds information pertaining to a rectangular area of the page being processed.

The patch structure comprises:

Patch number.

The patch number serves as a patch identifier. The patch number is calculated according to the physical location of the patch on the page. For example, the patch whose upper left corner falls on the (0,0) pixel coordinates is assigned the value 0. The next patch to the right is assigned the value 1 and so on, until the entire logical page is covered by patches. In the presently preferred embodiment of the invention, approximately 500 patches sized 256×256 are required to pave a letter page size @600 dpi.

Patch Type.

Each patch can be provided in one of the following four types. The same patch can change type during its life depending upon the information being processed. As the page processing begins, every patch type is defaulted to empty.

Empty patch, onto which no information has yet been rendered.

1 bit patch, holding one bit per pixel raster information, where such information may be either of black and white information or information from a single color plane.

8 bit patch, holding a byte long index to a color look up table per pixel. The color look up table holds a collection of a maximum of 256 colors, each represented by four bytes of data: Red, Green, and Blue+padding byte, or Cyan, Magenta, Yellow, and Black. A special case is grey only pages, where the color look up table can hold a collection of 256 shades, each encoded in one byte of data.

32 bit patches, holding RGB+padding information, or CMYK information according to the rendering mode.

Raw patch data pointer.

The raw patch data pointer is a reference to a portion of the memory where the uncompressed bitmap representation of the rectangular area belonging to a patch is stored:

When the patch type is empty, the pointer is NULL.

When type is 1 bit, the pointer points to a portion of memory where each bit represents a pixel (black or white or single color plane).

When the type is 8 bit, the pointer points to a portion of memory where each byte is the color look up table index of one pixel.

When the type is 32 bit, the pointer points to a memory area where each word (e.g. four bytes in the preferred embodiment of the invention) represents one pixel.

As such, a rendered logical page can be seen as a tiling of adjacent raw patch data. The sizes of the portions of memory pointed to by patch raw data pointers are a function of the patch size and its type. For instance, the memory size of a 256+256 32-bit type patch is 256 k bytes.

Patch height and width.

The patch height and width are not fixed once for all cases, but can be decided on a per page basis to best fit the page size, feed direction, and logical orientation (see FIG. 4 and the associated discussion thereof below), as well as expected file content and available cache memory size (see cache information below). All patches for a given page have the same dimensions.

2) Patch Cache.

The patch cache is a block of predefined size memory that can hold a number of patches. Note that at a given point in time, the cache can hold patches whose raw data pointers reference to areas that are nonadjacent and whose types may differ (I.e. empty, 1, 8, or 32 bit). The memory patch cache size can be modified, based on expected performance and available memory from the system.

3) Data Compressor/Decompressor.

A software or hardware compressor is provided to compress patch raw data from the cache into a compressed format. During this process, each patch raw datum is handled by the compressor as if it were a (small) page, so that any general purpose compression mechanism as is known in the art that applies to full pages can be used. An example compression mechanism is the software and hardware compressor described in L. Pardo, Image Rendering for Page Printers, PCT Application No. WO 97/02542, and in Y. Accad, Apparatus and Method for Hybrid Compression of Raster Data, U.S. patent application Ser. No. 08/773,656, filed Dec. 24, 1996.

A software or hardware decompressor, as is known in the art, is provided to decompress compressed patch data into patch raw data in the cache. An example decompression mechanism is the decompressor described in L. Pardo, Image Rendering for Page Printers, PCT Application No. WO 97/02542, and in Y. Accad, Apparatus and Method for Hybrid. Compression of Raster Data, U.S. patent application No. 08/773,656, filed Dec. 24, 1996.

4) Stitcher.

A stitching mechanism is provided that turns the compressed tiled representation of a logical page into either a compressed line representation, a compressed band representation, or,a compressed full page representation, using the patch compressed raster data and any additional information held in the different patch structures.

5) Page manager.

A page manager is provided that is responsible for storing compressed pages and feeding them to the print engine according to predefined rules.

6) Converter.

The converter is a hardware driven mechanism that turns the compressed page representation (line, band, or full page compressed) to an uncompressed form that is fed to the physical print engine.

Discussion.

Patch type promotion.

To optimize cache space usage, each patch data is assigned the minimal type with which to represent pertinent objects that intersect with the patch. For example, black text data only generates 1-bit patches, while look-up table based images are stored in 8-bit patches. If an object must be rendered onto a patch of a lesser type, the patch is first promoted to the desired type level. For example, if a piece of a RGB image is rendered onto a type 1 patch (only one bit info was rendered before, for instance black characters), then the type 1 patch is converted to a type 2 patch before the object can be rendered. Conversion from type 1 to type 2 patch involves the following different steps:

Make room in the patch cache for the new type patch.

Turn type 1 info (e.g. 1-bit) into type 2 info (e.g. 32-bit) by preserving color content.

Release type 1 patch memory.

Dynamic patch size selection.

Graphic file contents often have a preferred direction, i.e. the positioning on the page of the successive graphic objects in the graphic file follow a given path. For example, the preferred direction for a portrait text only page is horizontal, from left to right. Similarly, it is very likely that a landscape image data is provided line by line, from top to bottom, left to right.

In the cases where the paper feed direction (short edge v.s. long edge feed) is parallel to the preferred direction, it is very efficient to set the patch dimensions so that two rows of patches can be stored in the cache to span the entire page preferred direction. For example, on letter size paper, when processing a portrait document with short edge feed paper, or processing a landscape document with long edge feed, the patches are made thin enough so that the patch cache can hold enough patches to span the entire page two times (8.5 inches for portrait short edge feed or 11 inches for landscape long edge feed). At 600 dpi, with a cache size of 4 MB, and a portrait short edge feed page, the patch height is sized to 64. Indeed, 8.5(paper width)*600(res)*64(patch height)*4(4 bytes/pel)*2 (two rows) requires<4 MB of memory. Two rows are necessary to avoid memory thrashing when an object path (e.g. character) falls in between two rows of patches.

For other cases, where the preferred direction is orthogonal to the feed direction a square patch size is chosen.

FIG. 1 is a block schematic diagram showing a page processing overview according to the invention. An incoming data file 10 describing a page to be printed is provided to an interpreter 12. In the data file there is an object that is to be rendered by the interpreter (100).

The interpreter requests an uncompressed representation of a patch, in this example page number 3, where the patch intersects with the object that is to be rendered (110).

A patch cache 14 holds a collection of patches of different locations and different types. If the requested patch, i.e. patch number 3, is not in the patch cache, room is made in the patch cache by compressing the least recently used patch data. The requested patch is then decompressed into the patch cache from a compressor 16 (120).

The compressor holds a collection of compressed patch data that tiles the entire page. Each patch is compressed independently from one another (130). Thus, the logical page representation is broken down into patches, where the breakdown is known to the interpreter and the compressor (140).

A stitcher 18 uses a stitching process to turn the patch page representation into a compressed line, band, or full page representation (150). The representation is stored in a frame buffer 20. Dedicated hardware and/or software 22 decompresses the frame buffer on-the-fly and places colored dots on the printed page 24.

Figure 2:
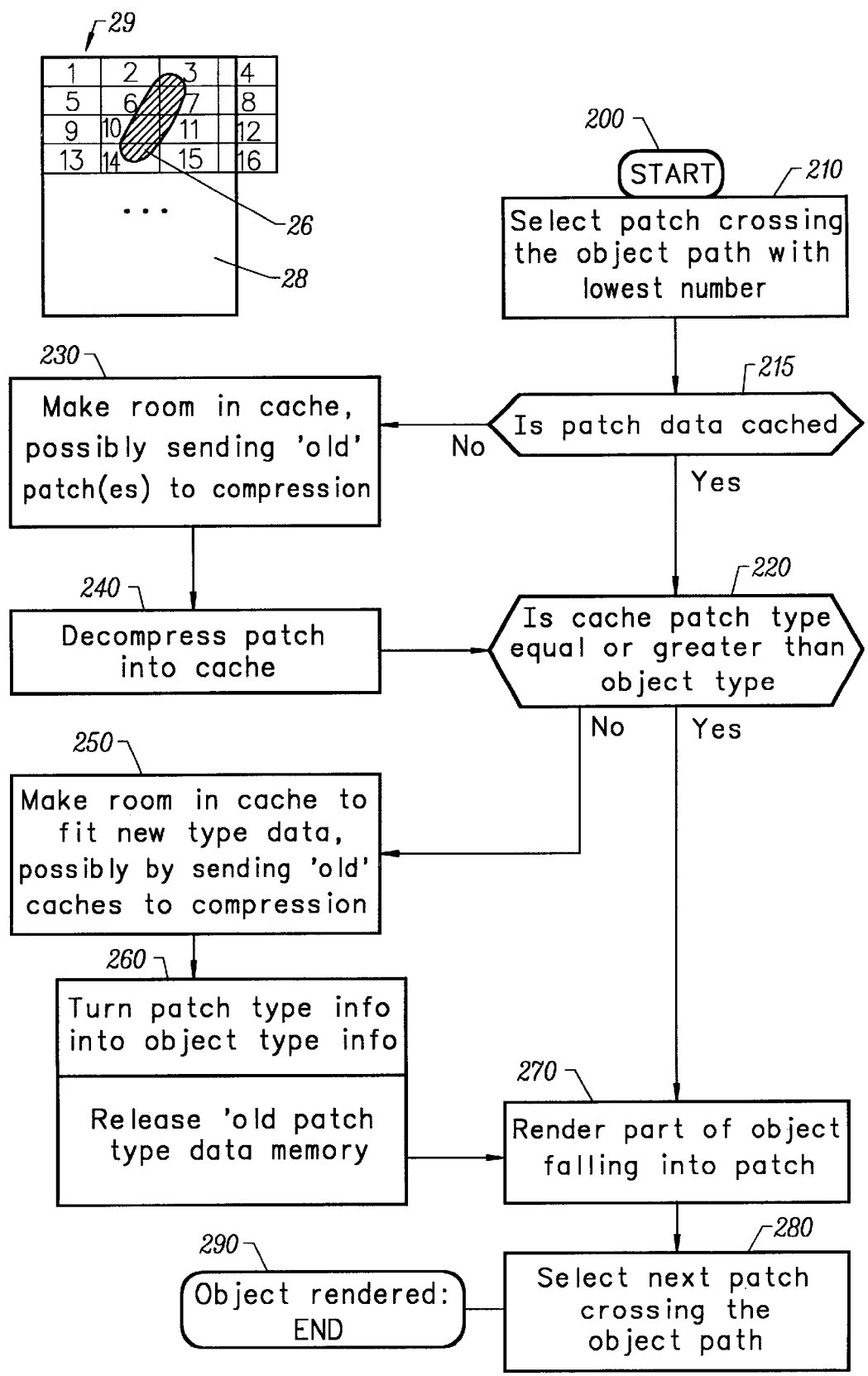
FIG. 2 is a flow diagram showing rendering of an object according to the invention.

FIG. 2 is a flow diagram showing rendering of an object according to the invention. The object to be rendered 26 is present on a physical page 28, where the page is divided into a plurality of patches 29. When object rendering commences (200), the object path crosses several patches. The patch that has the lowest number, e.g. patch number 2, is selected (210). Patch selection may occur in any other order in other embodiments of the invention.

A determination is made whether or not the patch is cached (215). If the patch is cached, a second determination is made whether or not the patch type is equal to or greater than the object type (220). If the patch type is equal to or greater than the object type, then the part of the object falling onto the patch is rendered (270) and the next patch crossing the object path is selected (280).

Again a determination is made whether or not the patch data are cached (215). If the data are not cached, room is made in the cache for the patch data, for example by removing and compressing the least recently used patch data (230). The new patch is then decompressed into the cache (240).

Again, a determination is made whether or not the cache patch type is equal to or greater than the object type (220). In this case, if the cache patch type is equal to or greater than the object type, room is made in the cache to fit the new type data, for example by removing and compressing the least recently used patch data (250).

The patch type information is then turned into object type information and old patch type memory is released (260). The part of the object falling onto the patch is rendered (270) and the next patch crossing the object path is selected (280). This process continues until the object is rendered (290).

Figure 3:
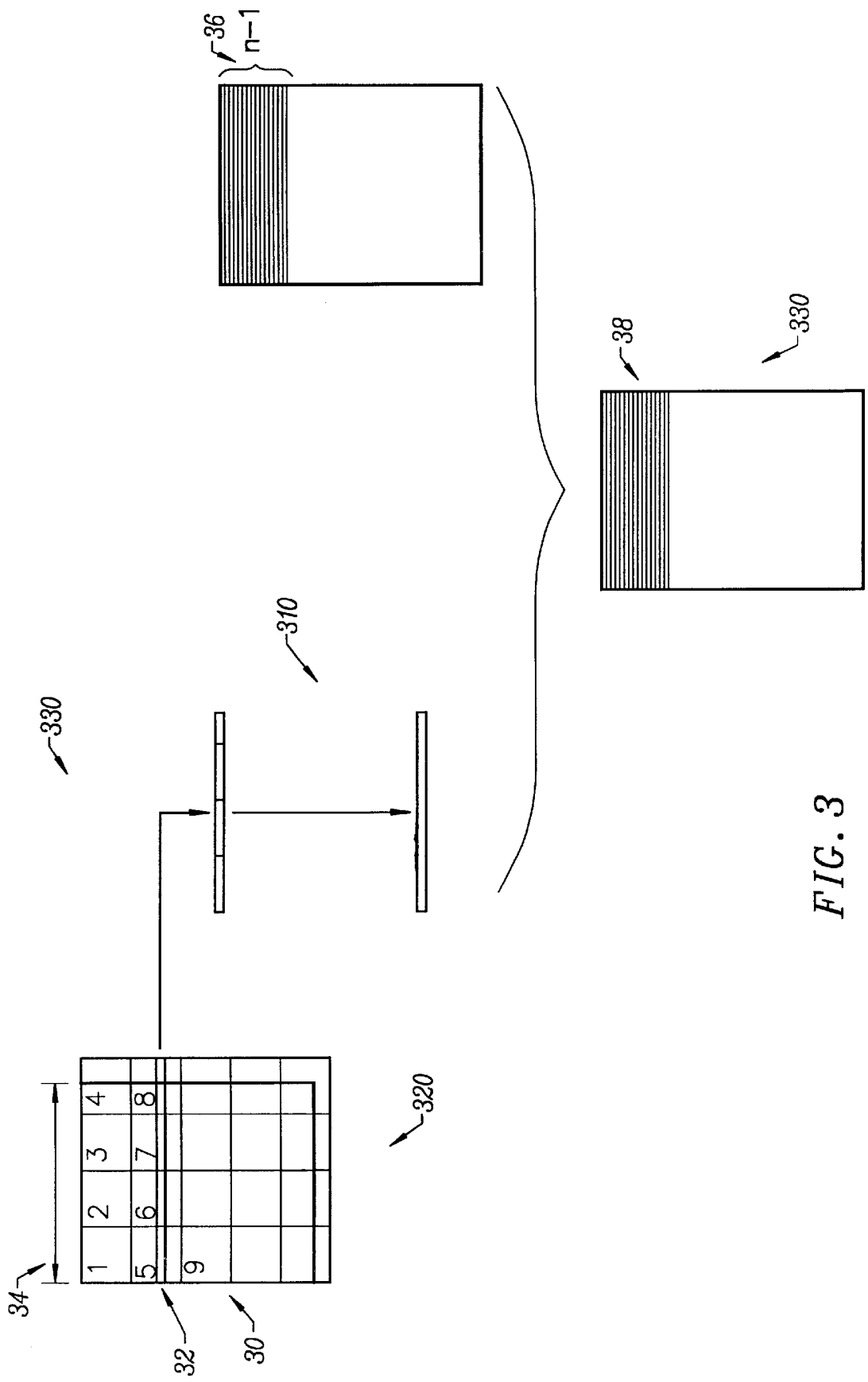
FIG. 3 is a block schematic diagram showing a stitching procedure according to the invention.

FIG. 3 is a block schematic diagram showing a stitching procedure according to the invention. The stitching procedure is explained in the context of an example in which line based compression is used to generate an $n^{th}$ line 32 in a page 30, where the page has a specific page width 34.

Dedicated software scans the patches to pick up data pertaining to the $n^{th}$ scan line (300). Each patched line is decompressed into a row data line according to patch types (310). The frame buffer is a patch compressed frame buffer in which each patch is compressed independently from each other (320).

As a result, the $n^{th}$ uncompressed scan line is compressed and stitched to a page 36 comprising n−1 compressed lines in the frame buffer (330). This process results in a page comprising n compressed lines 38.

Figure 4:
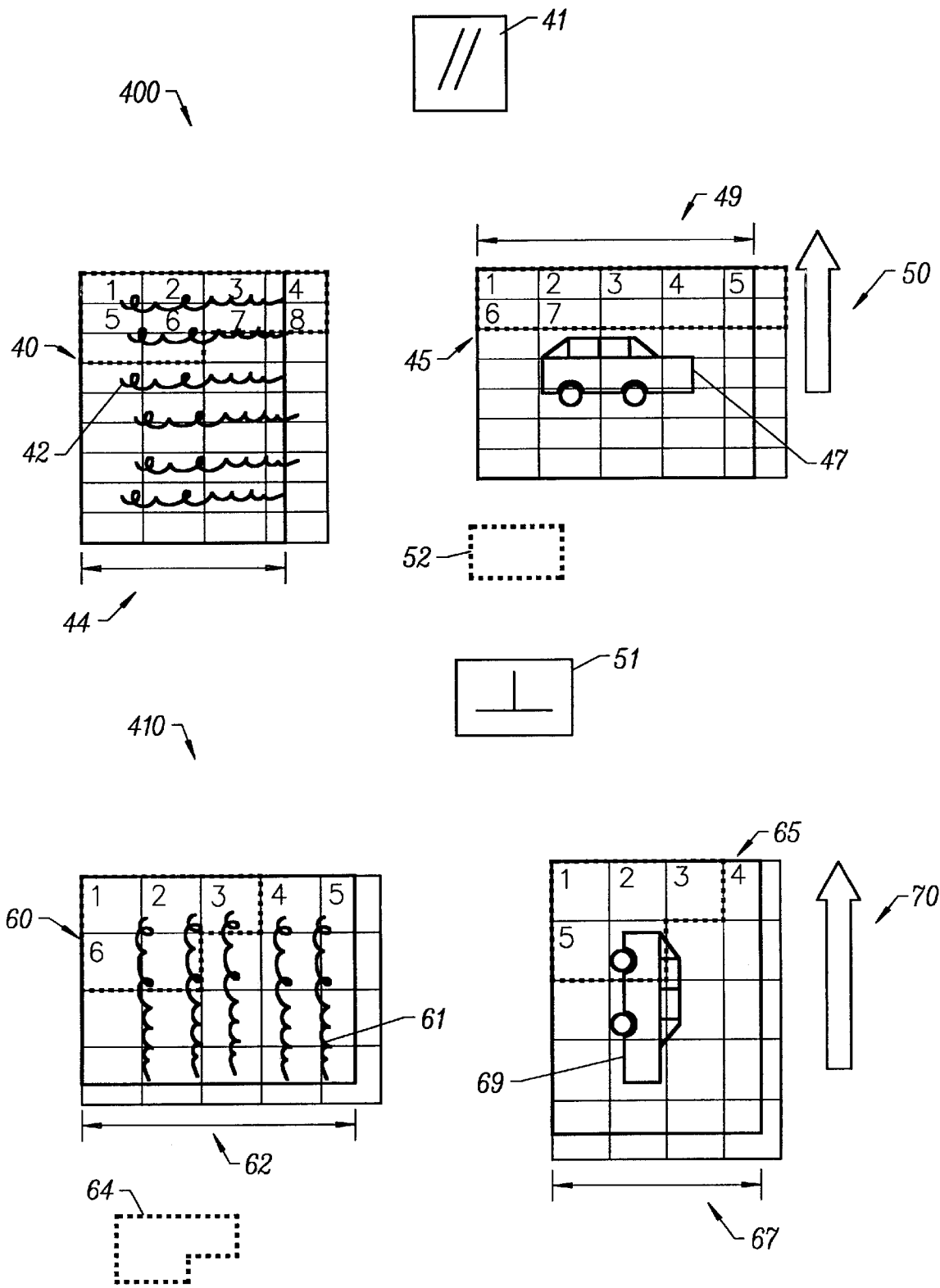
FIG. 4 is a block schematic diagram showing a selection of patch size according to the invention.

FIG. 4 is a block schematic diagram showing a selection of patch size according to the invention. In FIG. 4, a first example of patch size (400) involves a page in which feed direction and logical orientation are parallel 41, for example, where a short edge feed is used in portrait orientation or a long edge feed is used in landscape orientation. In this example, page feed direction is indicated by the numeric designator 50. In such case, rectangular patches may be used. Thus, a page 40 having a portrait orientation, that comprises text 42, and that has a page width 44 may be divided into patches generally having a rectangular shape 52. Likewise, a page 45 having a landscape orientation, that comprises graphics or images 47, and that has a page width 49 may also be divided into patches generally having a rectangular shape 52. It should be appreciated that text and or image/graphic information may be present in each page orientation and may be mixed on a page.

A second example of patch size (410) involves a page in which feed direction and logical orientation are perpendicular 51, for example, where a short edge feed is used in landscape orientation or a long edge feed is used in portrait orientation. In this example, page feed direction is indicated by the numeric designator 70. In such case, irregular patches may be used. Thus, a page 60 having a landscape orientation, that comprises text 61, and that has a page width 62 may be divided into patches generally having an irregular shape 64. Likewise, a page 65 having a portrait orientation, that comprises graphics or images 69, and that has a page width 67 may also be divided into patches generally having an irregular shape 64.

Embodiments

Three system architectures are considered in connection with the preferred embodiment of the invention, i.e. systems with an intermediate display list (DL), systems without a DL, and mixed systems. It will be appreciated by those skilled in the art that the invention is readily applicable to other systems and is therefore not limited to the foregoing systems.

For purposes of the invention, a display list is a list of graphic elements and their contexts stored during processing by the interpreter of the incoming graphic file. These elements are usually of one of the three following types: character, line drawings (also referred to as vectors or trapezoids), and images (also referred to as raster data).

When a system does not have a display list, each incoming graphic object is directly rendered onto the frame buffer. When a DL is available, the entire incoming file is processed and the graphic elements stored in the DL. Then, the DL is rendered onto the frame buffer, usually after some element sorting takes place. When the DL gets full (out of memory space) before the interpreter is through with the file at hand, the DL is usually flushed (i.e. it is rendered onto the frame buffer) so that the interpreter can resume filling it with new elements and their contexts.

1) Systems without intermediate display list storage.

The patch cache size in the preferred embodiment of the invention is at least equal to two times the size of a 32 bit patch.

Whenever a graphic object, be it a character, a line drawing, or an image, is to be rendered by a page description language (Postscript, PCL, TIFF, HTML the following steps take place:

The set of patches that are crossed by the object is determined.

For each patch in the set: if the patch is in the cache, the portion of the object falling into the patch is rendered onto the raw patch data. If the patch is in a compressed form, room is made in the cache by sending other patches to compression, and the relevant patch is decompressed into the cache. Then, the portion of the object falling into the patch is rendered onto the patch.

After all the graphic objects are rendered, the patch cache is flushed by compressing all the remaining raw patches in the cache. At that stage, the compressor holds a compressed representation of each patch.

The stitching mechanism turns the compressed patches into a stream of compressed lines, a set of compressed bands, or a compressed page, that is sent to the page manager.

Dedicated hardware is used by the page manager to feed the print engine with uncompressed (i.e. raw) data.

2) Systems with intermediate display list storage.

In this embodiment of the invention, the patch cache size is equal to or greater than one 32 bit patch size.

For each set of patches that fit in the cache, all the graphic objects that cross the set of patches are rendered onto the patches. The set of patches is sent to compression and a new set of patches are loaded into the cache, until all the DL is rendered.

The stitching mechanism turns the patches into a stream of compressed lines, a set of compressed bands, or a compressed page, that is sent to the page manager.

Dedicated hardware is used by the page manager to feed the print engine with uncompressed, i.e. raw, data.

3) Mixed Case.

The invention also applies to a mixed configuration, e.g. where the characters and line objects are stored in a display list when incoming raster information gets directly rendered.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

What is claimed is:

1. An apparatus for rendering color or black and white information for printing in a contone system, comprising:

an interpreter for receiving an incoming data file which represents a page or a set of pages that is to be printed, wherein said data file includes an object that is to be rendered by said interpreter and wherein said interpreter requests an uncompressed representation of a patch, where said patch intersects with said object that is to be rendered;

a patch cache for holding a collection of patches;

means for making room in said patch cache by compressing least recently used patch data if a requested patch is not in said patch cache;

a compression mechanism for decompressing said requested patch in said patch cache and compressing "raw" or native data, wherein said compression mechanism holds a collection of compressed patch data that tiles an entire page to be printed and wherein each patch is compressed independently from one another such that a logical page representation is broken down into said patches, where said breakdown is known to said interpreter and said compression mechanism;

a stitcher that uses a stitching process to turn said patch page representation into any of a compressed line, band, or full page representation;

a frame buffer for storing said page representation; and means for decompressing said frame buffer pursuant to printing said page.

2. A method for rendering color or black and white information for printing in a contone system, said method comprising the steps of:

dividing a page to be printed into a plurality of patches, wherein an object to be rendered is present on said page;

selecting a most compact patch type when object rendering commences and where an object path crosses several patches;

determining whether or not said patch is cached;

determining whether or not the patch type is equal to or greater than a predetermined object type if said patch is cached;

rendering a part of the object falling onto said patch if said patch type is equal to or greater than said object type;

selecting a next patch crossing said object path;

determining whether or not said patch is cached;

making room in said cache for said patch if said patch is not cached by removing and compressing a least recently used patch;

decompressing a new patch into said cache;

determining whether or not a cache patch type is equal to or greater than a predetermined object type;

making room in said cache to fit said new type data if said cache patch type is equal to or greater than said object type by removing and compressing a least recently used patch;

turning said patch type information into object type information;

releasing old patch type memory;

rendering a part of said object falling onto said patch; and selecting a next patch crossing said object path;

wherein said process continues until said object is rendered.

3. A method for rendering color or black and white information for printing in a contone system, said method comprising the steps of:

receiving an incoming data file which represents a page that is to be printed, wherein said data file includes an object that is to be rendered by an interpreter, and wherein said interpreter requests an uncompressed representation of a patch, where said patch intersects with said object that is to be rendered;

producing a page patch representation;

using a stitching process to turn a patch page representation into a compressed line, band, or full page representation; and storing said page representation in a memory for printing.

4. The method of claim 3, further comprising the steps of:

holding a collection of patches of different locations and different types in a patch cache;

decompressing a requested patch in said patch cache, wherein a compressor holds a collection of compressed patch data that tiles an entire page to be printed, and wherein each patch is compressed independently from one another such that a logical page representation is broken down into patches, where said breakdown is known to said interpreter and said compressor; and decompressing said memory pursuant to printing said page.

5. The method of claim 4, further comprising the step of:

making room in said patch cache by compressing least recently used patch data if a requested patch is not in said patch cache.

6. The method of claim 3, wherein said memory is a patch compressed frame buffer in which each patch is compressed independently from each other.

7. The method of claim 3, wherein said patch has a shape that is a function of any of page feed direction and logical orientation.

8. An apparatus for rendering color or black and white information for printing in a contone system, comprising:

an interpreter for receiving an incoming data file which represents a page that is to be printed, wherein said data file includes an object that is to be rendered by said interpreter, and wherein said interpreter requests an uncompressed representation of a patch, where said patch intersects with said object that is to be rendered;

means for producing a page patch representation;

a stitcher for turning a patch page representation into a compressed line, band, or full page representation; and a memory storing said page representation for printing.

9. The apparatus of claim 8, further comprising:
a patch cache for holding a collection of patches of different locations and different types;
a compression mechanism for decompressing a requested patch in said patch cache, wherein said compressor holds a collection of compressed patch data that tiles an entire page to be printed, and wherein each patch is compressed independently from one another such that a logical page representation is broken down into patches, where said breakdown is known to said interpreter and said compression mechanism; and
means for decompressing said memory pursuant to printing said page.

10. The apparatus of claim 9, further comprising:
means for making room in said patch cache by compressing least recently used patch data if a requested patch is not in said patch cache.

11. The apparatus of claim 8, wherein said memory is a patch compressed frame buffer in which each patch is compressed independently from each other.

12. The apparatus of claim 8, wherein said patch has a shape that is a function of any of page feed direction and logical orientation.

13. An apparatus for rendering color or black and white information for printing in a contone system, comprising:
an interpreter for receiving an incoming data file which represents a page that is to be printed, wherein said data file includes an object that is to be rendered by said interpreter, and wherein said interpreter requests an uncompressed representation of a patch, where said patch intersects with said object that is to be rendered, and wherein said patch is a structure that holds information pertaining to a rectangular area of said page;
means for producing a page patch representation;
a stitcher for turning a patch page representation into a compressed line, band, or full page representation; and
a memory storing said page representation for printing.

14. The apparatus of claim 13, wherein said patch structure comprises any of the following:
a patch number which serves as a patch identifier, wherein said patch number is calculated according to a physical location of said patch on said page;
a patch type which may comprise an empty patch, onto which no information has yet been rendered, a 1 bit patch that holds one bit per pixel raster information, an 8 bit patch that holds a byte long index to a color look up table per pixel, and a 32 bit patch which holds either RGB+padding information or CMYK information according to the rendering mode;
raw patch data which serve as a pointer to a portion of a system memory where an uncompressed bitmap representation of said rectangular area belonging to a patch is stored, wherein said pointer is NULL when said patch type is empty, said pointer points to a portion of memory where each bit represents a pixel when type is 1 bit, said pointer points to a portion of memory where each byte is said color look up table index of one pixel when said type is 8 bit, and said pointer points to a memory area where each word represents one pixel when the type is 32 bit; and
patch height and width which are decided on a per page basis to fit page size, feed direction, and logical orientation best, as well as expected file content.

15. The apparatus of claim 13, further comprising:
a patch cache consisting of a block of predefined size memory that can hold a number of patches.

16. The apparatus of claim 15, further comprising:
compression mechanism for compressing patch raw data from said patch cache into a compressed format.

17. The apparatus of claim 16, further comprising:
a decompressor for decompressing as compressed patch data into patch raw data in said patch cache.

18. The apparatus of claim 13, wherein said stitcher turns the compressed tiled representation of a logical page into either a compressed line representation, a compressed band representation, or a compressed full page representation, using patch compressed raster data and any additional information held in various patch structures.

19. The apparatus of claim 13, further comprising:
a page manager for storing compressed pages and feeding them to a print engine according to predefined rules.

20. The apparatus of claim 13, further comprising:
a converter for turning said compressed page representation (line, band, or full page compressed) to an uncompressed form that is fed to a physical print engine.

21. A method for rendering color or black and white information for printing in a contone system, comprising the steps of:
receiving an incoming data file which represents a page that is to be printed, wherein said data file includes an object that is to be rendered by an interpreter, and wherein said interpreter requests an uncompressed representation of a patch, where said patch intersects with said object that is to be rendered, and wherein said patch is a structure that holds information pertaining to a rectangular area of said page;
producing a page patch representation;
turning a patch page representation into a compressed line, band, or full page representation with a stitcher; and
storing said page representation for printing.

22. The method of claim 21, wherein said patch structure comprises any of the following:
a patch number which serves as a patch identifier, wherein said patch number is calculated according to a physical location of said patch on said page;
a patch type which may comprise an empty patch, onto which no information has yet been rendered, a 1 bit patch that holds one bit per pixel raster information, an 8 bit patch that holds a byte long index to a color look up table per pixel, and a 32 bit patch which holds either RGB+padding information or CMYK information according to the rendering mode;
raw patch data which serve as a pointer to a portion of a system memory where an uncompressed bitmap representation of said rectangular area belonging to a patch is stored, wherein said pointer is NULL when said patch type is empty, said pointer points to a portion of memory where each bit represents a pixel when type is 1 bit, said pointer points to a portion of memory where each byte is said color look up table index of one pixel when said type is 8 bit, and said pointer points to a memory area where each word represents one pixel when the type is 32 bit; and
patch height and width which are decided on a per page basis to fit page size, feed direction, and logical orientation best, as well as expected file content.

23. The method of claim 21, further comprising the step of:
providing a patch cache consisting of a block of predefined size memory that can hold a number of patches.

24. The method of claim 23, further comprising the step of:

compressing patch raw data from said patch cache into a compressed format.

25. The method of claim 24, further comprising the step of:

decompressing as compressed patch data into patch raw data in said patch cache.

26. The method of claim 21, wherein said stitcher turns the compressed tiled representation of a logical page into either a compressed line representation, a compressed band representation, or a compressed full page representation, using patch compressed raster data and any additional information held in various patch structures.

27. The method of claim 21, further comprising the step of:

storing compressed pages and feeding them to a print engine according to predefined rules.

28. The method of claim 21, further comprising the step of:

turning said compressed page representation (line, band, or full page compressed) to an uncompressed form that is fed to a physical print engine.

29. The method of claim 21, wherein said method is implemented in any of systems having an intermediate display list (DL), systems without a DL, and mixed systems, wherein a display list is a list of graphic elements and their contexts stored during processing by said interpreter of incoming graphic file, wherein said elements are of any one of the three following types: character, line drawings (also referred to as vectors or trapezoids), and images (also referred to as raster data).

30. The method of claim 29, wherein each incoming graphic object is directly rendered onto a frame buffer when a system does not have a display list.

31. The method of claim 29, wherein an entire incoming file is processed and graphic elements stored in said DL when a DL is available, and wherein said DL is rendered onto said frame buffer.

32. The method of claim 29, further comprising the steps of:

determining a set of patches that are crossed by said object;

rendering a portion of said object falling into a patch onto raw patch data for each patch in said set if said patch is in a patch cache;

making room in said patch cache by sending other patches to compression if said patch is in a compressed form;

decompressing a relevant patch into said patch cache; and rendering a portion of an object falling into said patch onto said patch.

33. The method of claim 32, wherein said patch cache is flushed by compressing all remaining raw patches in said patch cache after all the graphic objects are rendered, wherein said compressor holds a compressed representation of each patch.

34. The method of claim 33, wherein said stitcher turns said compressed patches into a stream of compressed lines, a set of compressed bands, or a compressed page, that is sent to a page manager which feeds a print engine with uncompressed data.

35. The method of claim 29, wherein all graphic objects that cross a set of patches are rendered onto said patches for each set of patches that fit in said patch cache; and wherein said set of patches is sent to compression and a new set of patches are loaded into said patch cache until all of said DL is rendered.

36. The method of claim 35, wherein said stitcher turns said patches into a stream of compressed lines, a set of compressed bands, or a compressed page, that is sent to a page manager which feeds a print engine with uncompressed data.

37. The method of claim 29, wherein characters and line objects are stored in a display list when incoming raster information gets directly rendered.

38. The method of claim 21, wherein each patch data is assigned a minimal type with which to represent pertinent objects that intersect with said patch, wherein said patch is first promoted to a desired type level if an object must be rendered onto a patch of a lesser type.

* * * * *